US009267862B1

(12) United States Patent
Kavars et al.

(10) Patent No.: US 9,267,862 B1
(45) Date of Patent: Feb. 23, 2016

(54) SENSOR AND MONITORING SYSTEM FOR STRUCTURAL MONITORING

(75) Inventors: Christopher Lee Kavars, Elkader, IA (US); Leslie Davis, Elkader, IA (US)

(73) Assignee: SENSR MONITORING TECHNOLOGIES LLC, Georgetown, TX (US)

( * ) Notice: Subject to any disclaimer, the term of this patent is extended or adjusted under 35 U.S.C. 154(b) by 1208 days.

(21) Appl. No.: 12/706,880

(22) Filed: Feb. 17, 2010

Related U.S. Application Data

(60) Provisional application No. 61/153,415, filed on Feb. 18, 2009.

(51) Int. Cl.
*G01M 5/00* (2006.01)
*G01P 15/08* (2006.01)

(52) U.S. Cl.
CPC ......... *G01M 5/0008* (2013.01); *G01P 15/0891* (2013.01)

(58) Field of Classification Search
CPC .................................. G08B 1/08; D05B 21/00
USPC ........................................ 702/160; 73/514.35
See application file for complete search history.

(56) References Cited

U.S. PATENT DOCUMENTS

| 4,570,353 | A | * | 2/1986 | Evans | E21B 47/02232 33/304 |
|---|---|---|---|---|---|
| 4,956,999 | A | * | 9/1990 | Bohannan et al. | 73/587 |
| 5,067,674 | A | * | 11/1991 | Heyche | G05D 1/0011 244/190 |
| 5,191,713 | A | * | 3/1993 | Alger et al. | 33/315 |
| 5,774,376 | A | * | 6/1998 | Manning | 702/56 |
| 6,181,841 | B1 | * | 1/2001 | Hodge | 385/12 |
| 6,225,574 | B1 | * | 5/2001 | Chang et al. | 177/139 |

(Continued)

FOREIGN PATENT DOCUMENTS

| EP | 1213561 B1 | * | 8/2005 | ............. G01C 22/00 |
|---|---|---|---|---|
| EP | 1213561 B1 | * | 8/2005 | ............. G01C 22/00 |

OTHER PUBLICATIONS

Basharat et al., A Framework for Intelligent Sensor Network with Video Camera for Structural Health Monitoring of Bridges, Proceedings of the 3rd Int'l Conf. on Pervasive Computing and Communications Workshops (PerCom 2005 Workshops).*

(Continued)

*Primary Examiner* — Gregory J Toatley
*Assistant Examiner* — Michael Dalbo
(74) *Attorney, Agent, or Firm* — Parsons Behle & Latimer

(57) ABSTRACT

A method and system for monitoring the integrity of a structure such as a building or a bridge includes taking accelerometer readings using an accelerometer and taking inclinometer readings using an inclinometer. The accelerometer and inclinometer each take readings in at least one axis, with one coincident axis between the two. The accelerometer readings are preferentially sampled at a higher rate than the inclinometer readings. Accelerometer readings verify inclinometer readings, and vice-versa. Using acceleration readings, it can be determined whether, when, and at what frequency inclination readings should be taken. The inclinometer can be powered down as long as accelerometer readings indicate that the environment would strain the inclinometer. Inclinometer readings can also be modified and corrected using inclinometer readings. Data accuracy and reliability are enhanced, and the overall integrity of a structure is dynamically monitored even as the structure and its environment change over time.

4 Claims, 7 Drawing Sheets

(56) References Cited

U.S. PATENT DOCUMENTS

| | | | |
|---|---|---|---|
| 6,301,964 B1 * | 10/2001 | Fyfe | A63B 69/0028 702/160 |
| 6,449,857 B1 * | 9/2002 | Anikolenko | 33/366.11 |
| 6,453,266 B1 * | 9/2002 | Chainer | G06F 1/1613 340/506 |
| 7,231,825 B2 * | 6/2007 | Davidson | 73/510 |
| 7,231,826 B2 * | 6/2007 | Bossi et al. | 73/618 |
| 2002/0170193 A1 * | 11/2002 | Townsend et al. | 33/512 |
| 2005/0237209 A1 * | 10/2005 | Van Dongen | 340/573.7 |
| 2006/0028345 A1 * | 2/2006 | Lee | 340/573.2 |
| 2006/0143645 A1 * | 6/2006 | Vock | A43B 3/00 725/9 |
| 2006/0221187 A1 * | 10/2006 | Alhadef | 348/207.1 |
| 2006/0232025 A1 * | 10/2006 | Braud | B60G 9/02 280/5.508 |
| 2006/0243180 A1 * | 11/2006 | Sundermeyer et al. | 112/470.06 |
| 2007/0038393 A1 * | 2/2007 | Borah et al. | 702/56 |
| 2007/0093945 A1 * | 4/2007 | Grzywna et al. | 701/23 |
| 2007/0106483 A1 * | 5/2007 | Kelley | G01P 15/0891 702/141 |
| 2007/0118328 A1 * | 5/2007 | Vock et al. | 702/160 |
| 2007/0144396 A1 * | 6/2007 | Hamel et al. | 102/472 |
| 2007/0169364 A1 * | 7/2007 | Townsend et al. | 33/512 |
| 2007/0250732 A1 * | 10/2007 | Wong et al. | 713/324 |
| 2008/0087082 A1 * | 4/2008 | Moon | G01C 9/00 73/514.05 |
| 2009/0138103 A1 * | 5/2009 | Nakamura et al. | 700/69 |
| 2009/0153482 A1 * | 6/2009 | Weinberg et al. | 345/163 |
| 2009/0309793 A1 * | 12/2009 | Loomis | 342/357.14 |
| 2010/0100338 A1 * | 4/2010 | Vik et al. | 702/42 |
| 2010/0261980 A1 * | 10/2010 | Peng et al. | 600/301 |
| 2011/0029276 A1 * | 2/2011 | Cabral Martin | 702/141 |

OTHER PUBLICATIONS

SignalQuest, "Datasheet Solid-State MEMS Inclinometer With analog and digital (serial) output ", SignalQuest Inc. 1999-2004, pp. 1-12.*

* cited by examiner

SENSOR AND MONITORING SYSTEM FOR STRUCTURAL MONITORING

CROSS-REFERENCE TO RELATED APPLICATIONS

This application claims priority under 35 USC §119(e) to U.S. Provisional Patent Application 61/153,415 filed Feb. 18, 2009, the entirety of which is incorporated by reference herein.

FIELD OF THE INVENTION

This document concerns an invention relating generally to monitoring of structural integrity, and more specifically to a method and system for monitoring structural integrity using a sensor that includes an inclinometer and an accelerometer.

BACKGROUND OF THE INVENTION

Man-made and natural structures such as bridges, buildings, roads, parking garages, amusement park rides, hills, and the ground can move as a result of many influences. A structure can, for example, move from changes in its load (such as increases or decreases in the number of occupants, cars, trains, etc.), externally-induced vibration (such as vibration from local traffic, construction, earthquakes, wind, etc.), and other factors. If motions remain within a structure's design parameters, the structure is not likely to be at risk or a safety hazard. However, structures are at the mercy of their environment, and natural and unnatural influences have the potential for exerting more force on the structure than it is safely able to withstand. Also, a structure's ability to withstand forces may deteriorate from age, inadequate maintenance, or improper modification. Identifying damaging environmental inputs and unacceptable structural responses is critical for maintaining the safety and viability of the structure.

An accelerometer may be used to detect vibrations experienced by a structure, but accelerometers do not reveal whether the structure is tilting. An inclinometer may be used to detect changes in tilt, but they are designed to measure fixed angles that are maintained or constant and are thus not well-suited for dynamic environments. Inclinometers have a low sampling rate because they are designed to measure the low-frequency phenomenon of tilt with respect to gravity. Neither an accelerometer nor an inclinometer can by itself accurately discern motion from tilt. Acceleration signals may show up as artificial tilt, and tilt may show up as partial acceleration. For applications demanding precision, knowing what is inclination and what is acceleration can make a significant difference. When a building responds to a dynamic input, the responses are complex motions that have vibrations, inclinations, displacements, and roll components intermingled with each other and masking one another, making it very difficult to ascertain actual responses.

Also, inclinometers are sensitive, high-precision devices intended for relatively quiet environments, and they are consequently susceptible to damage in extreme environments. But by the time an unacceptable condition is observed using an inclinometer, it is usually too late to power down the inclinometer to prevent damage.

One representative dynamic environment is railway bridges, which are "live load" structures that carry more weight than their mass. That is, the weight of trains and train cars that traverse railway bridges often weigh many more times than the railway bridge itself. As a result, the bridge elements (spans, piers, and columns) move and vibrate tremendously when carrying the weight of trains. Such motions and vibrations cause conventional inclinometers to misread, and expose inclinometers to motions beyond their operational limits. As a consequence of such compromised performance, bridge engineers are not able to get a true reading during loading, and often are left with damaged sensor elements after loading.

What is needed is a monitoring method and system that can reliably monitor the overall integrity of a structure by overcoming these and other shortcomings.

SUMMARY OF THE INVENTION

The invention involves a method and system that is intended to at least partially solve the aforementioned problems. To give the reader a basic understanding of some of the advantageous features of the invention, following is a brief summary of preferred versions of the structural integrity monitoring method and system, with reference being made to the accompanying drawings (which are briefly reviewed in the following "Brief Description of the Drawings" section of this document) to assist the reader's understanding. Because the following discussion is merely a summary, it should be understood that more details regarding the preferred versions may be found in the Detailed Description set forth elsewhere in this document. The claims set forth at the end of this document then define the various versions of the invention in which exclusive rights are secured.

In an exemplary version, a method for monitoring structural integrity includes taking inclinometer readings using an inclinometer and taking accelerometer readings using an accelerometer. The accelerometer measures three-dimensional dynamic responses related to vibration, impact, shock, displacement, etc., while the inclinometer measures tilt, attitude, etc. The inclinometer readings are taken along at least one inclinometer axis, and the accelerometer readings are taken along at least one accelerometer axis, with at least one axis that is common between the inclinometer and the accelerometer. The inclinometer preferably takes readings along two axes and the accelerometer preferably takes readings along three axes.

Inclinometer readings are taken at an inclinometer sampling rate and accelerometer readings are taken at an accelerometer sampling rate. The accelerometer sampling rate is preferably substantially higher than the inclinometer sampling rate, permitting the accelerometer to detect more rapidly changing forces. Inclinometer readings may be taken simultaneously with accelerometer readings.

The inclinometer is preferably a dedicated inclinometer tasked only with taking inclination readings in one or more axes, and the accelerometer is preferably a separate, dedicated accelerometer tasked only with taking acceleration readings in one or more axes. As depicted in FIGS. 1 and 2, the inclinometer and the accelerometer are preferably housed in a sensor module 10 that is attached to the structure being monitored in a manner that does not dampen the forces experienced by the sensor module 10. The sensor module 10 may be, for example, mounted to a bridge 20 or a building 60, and the sensor module 10 could transmit its readings to a computer 30 through a network. Sensor module 10 may alternatively be placed on any man-made or natural structure where monitoring is desired. Optionally, video, audio, or still images can be obtained around the structure using a camera 80 and a microphone (not separately pictured).

The accelerometer readings taken using the sensor module 10 are used to make a determination regarding the quality, accuracy, or reliability of inclinometer readings, and vice-versa. For example, an "AC-response" accelerometer, which measures changes in acceleration, typically has a frequency response that only goes down to 2 Hertz ("Hz"), making it unable to measure a constant acceleration at 0 Hz. A "DC-response" accelerometer, which can measure constant accelerations such as gravity, can measure down to about 0 Hz. However, because of its ability to measure accelerations down to a frequency of zero, DC-response accelerometer readings include the acceleration due to gravity. The acceleration due to gravity can be determined using the attitude measurements of inclinometer readings. Inclinometer readings can thus be used to remove the vectored 0 Hz component due to gravity from the accelerometer readings. As a result, it can be determined whether accelerometer readings showing a constant acceleration are due to the pull of gravity or to other influences.

Additionally, an inclinometer becomes more useful using readings from an accelerometer. For example, based on accelerometer readings, a sampling routine could be assigned to the inclinometer, such as when, for how long, and at what frequency inclinometer readings are taken. The sampling routine may be designed such that inclinometer readings are only taken when the power level (based on amplitude, duration, and frequency) of accelerometer readings is below a threshold and the environment is thus relatively quiet. Readings may only be taken for a given duration so as to reduce wear and tear on the high-precision device. And because tilting events occur at varying frequency, an incorrect inclinometer sampling rate would yield misleading inclination readings. Further, as a structure ages, is fatigued, or experiences variable loading over time, its responsiveness to different environmental influences changes. As such, the sampling routine may be dynamically adjusted as the structure and its environment evolve.

Inclinometer readings could moreover be filtered to remove vibrational noise that is identified using accelerometer readings. An inclinometer confidence factor ranging from, for example, "zero" to "one" can optionally be calculated using the acceleration readings, such that the confidence factor inversely correlates with the severity of vibrations detected by the accelerometer. A "zero" confidence factor, for example, may be calculated when the power of acceleration readings is above a first threshold, indicating that inclinometer readings are likely not trustworthy because a high level of accelerations may have interfered with inclinometer readings. Analogously, a "one" confidence factor may be calculated when acceleration readings fall below a second threshold, indicating that inclinometer readings are likely to be trustworthy because of a low level of potentially-interfering accelerations.

An inclinometer may have an ideal frequency response range within which readings are most reliable. Using readings taken with the accelerometer, it can be determined whether an active inclinometer is operating in its ideal frequency response range. Depending on accelerometer readings, inclinometer readings can be ceased if readings would not be accurate or reliable. Inclinometers are high-precision devices that are by their nature fragile, requiring careful handling. Thus, if accelerometer readings indicate that the inclinometer could be damaged or otherwise strained by its environment, the inclinometer can be powered down until environmental conditions improve. For example, the inclinometer may be powered down while accelerometer readings are above a predefined threshold so that the inclinometer does not exceed the optimal operating conditions dictated by its technical specifications. Also, by analyzing accelerometer readings, a determination can be made as to whether the inclinometer was already exposed to potentially damaging input. An analysis may include the identification and classification of a vibrational episode or other event to which the inclinometer was exposed. A vibrational episode includes, for example, a train or truck passing, an impact caused by a collision or a projectile, nearby construction, an explosion, an earthquake, a wind gust, or other natural and unnatural phenomena.

Exemplary versions of the invention measure the movements of structures resulting from, for example, vibration, inclination, shock, and impact, and report the dynamic responses of a structure or object that is subjected to dynamic loading. Dynamic loading can be intentional or unintentional, or static or dynamic, resulting from, for example, trains, wind, gravity, earthquakes, traffic, and explosions. Here, users are able to determine which aspect of the structure's response is vibration, inclination, displacement, roll, etc., so that engineers have a better understanding of the actual response behavior.

An exemplary sensor module 10 combines accelerometers and inclinometers into one package that can easily be mounted to any man-made or natural structure. Once mounted, the package measures the dynamic response of the structure with its separate signal channels (for example, three accelerometer channels and two inclinometer channels). The data channels are sampled simultaneously so that individual data points can be considered both on their own as well as within the context of each other. Accelerometer measurements are analyzed, for example, with respect to polarity, amplitude, duration, and frequency components. Inclination measurements are analyzed, for example, with respect to polarity, amplitude, and rate of change. Considering individual sensor channels within the context of other sensor inputs permits the identification of conditions that invalidate a sensor channel's measurement. If such a condition is identified, a value may be either modified before it is reported or it may not be reported at all. For example, the system can measure the motion and vibration of a structure and use those inputs to internally qualify the accuracy of the inclination readings.

Exemplary sensor module 10 can be instructed regarding when to take accelerometer or inclinometer readings, or what readings to include or exclude from samples taken. For example, based on a set of readings a response signature representative of the structure's response to a set of external forces can be determined. The identified set of external forces may represent, for example, a jackhammer in a nearby construction site. Using the response signature characterizing the structure's response to the jackhammer, it can be decided that accelerometer readings are not reported, for example, unless a threshold is surpassed, such as 0.2 g (where "g" is the acceleration due to gravity, or 9.8 meters per second squared), and inclinometer readings are only reported if they surpass another threshold, such as a 2 degree tilt change. This permits filtering of sensor readings such that environmental phenomena not deemed significant can be ignored and environmental phenomena of interest can be focused on. The use of threshold criteria based on recognized response signatures can be adjusted dynamically and frequently, such that accelerometer and inclinometer readings are included and excluded based on the current state of the structure's changing environment.

As inclinometers are often placed in remote locations requiring special equipment to be accessed, accuracy, reliability, and longevity are necessary to provide value. Bad readings result in poor decisions, and compromised reliability increases service costs and reduces system usefulness and coverage. The methods and system at hand can identify an operating environment and, among other things, use acquired data to: (1) determine if a reading should be considered; (2) qualify the quality of a reading; (3) apply correcting procedures to readings based on the environment; (4) protect itself from damage; (5) identify whether it was exposed to a potentially damaging input; and (6) identify what events it has been exposed to and when the exposures occurred. Additionally, when acquiring a conventional inclinometer or accelerometer, one does not know whether a given system is suitable for a particular structure or environment. The exemplary system discussed here permits modification of monitoring parameters to suit the particular structure and unique environment, saving acquisition expenses, time, and other costs.

Further advantages and features of the invention will be apparent from the remainder of this document in conjunction with the associated drawings.

DETAILED DESCRIPTION OF PREFERRED VERSIONS OF THE INVENTION

Figure 1:
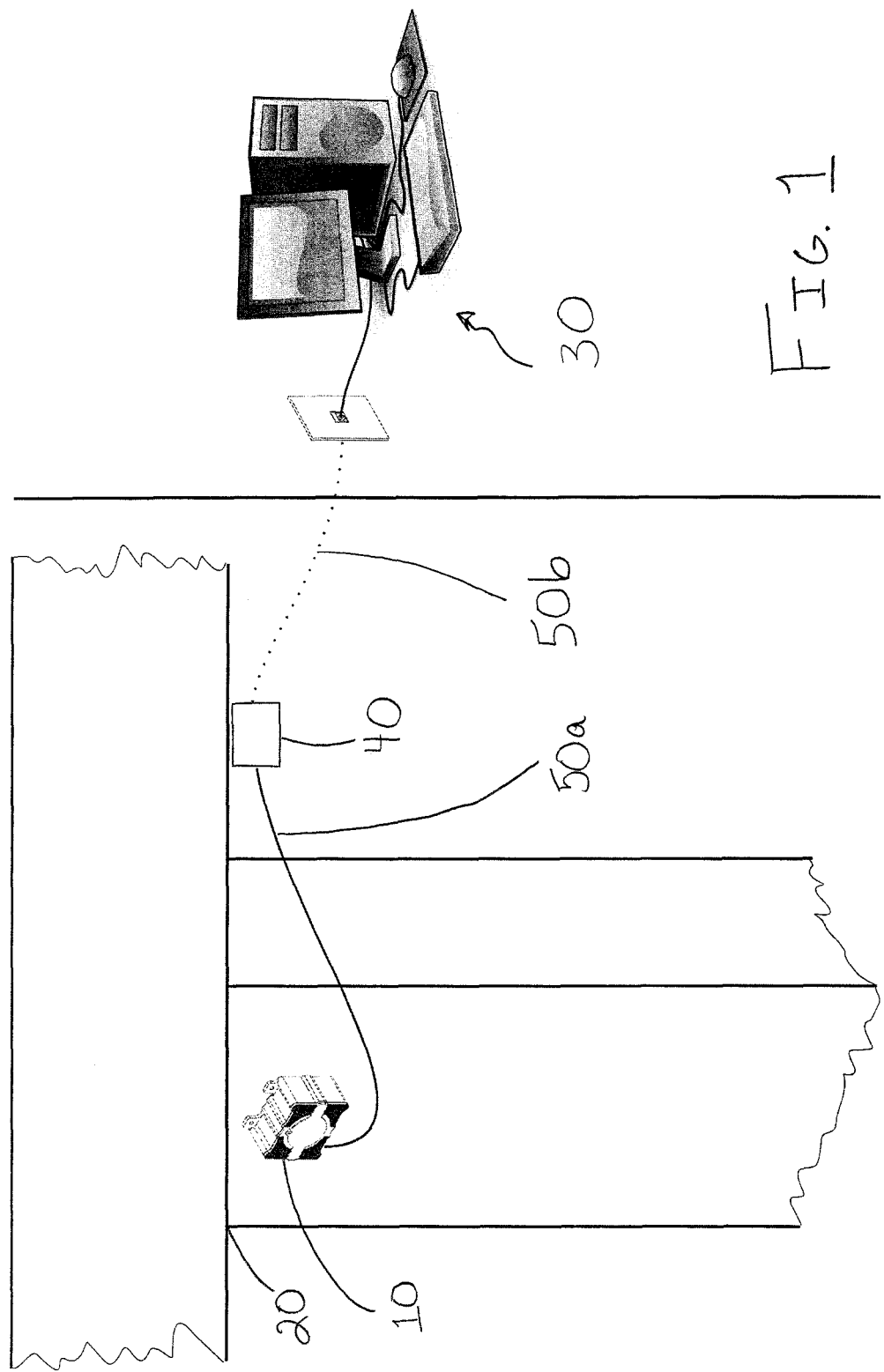
FIG. 1 is diagram showing an exemplary version of a sensor module attached to a structure and connected to a computer through a network.

Continuing the discussion in the above Summary of the Invention section, FIG. 1 depicts an exemplary sensor module 10 attached to a bridge 20 to monitor the integrity of the bridge 20. The sensor module 10 is connected to a computer 30 via a communication device 40. Sensor module 10 preferably receives set-up and configuration instructions from computer 30, such as which sensors should be active and what mode of data acquisition to operate in. The communication device 40 can be any device capable of communicating through a communications network, such as a network access point or a modem. Communication device 40 need not be separate from sensor module 10 but instead may be integrated with sensor module 10. Sensor module 10 communicates with communication device 40 through a communication channel 50a, and communication device 40 communicates with computer 30 through communication channel 50b. Communication channels 50a and 50b can be any wired or wireless channel for carrying data from place to place, such as USB, Ethernet, and direct to fiber installation. Using appropriate software, computer 30 is capable of collecting, processing, analyzing, and presenting the data received from sensor module 10.

Figure 2:
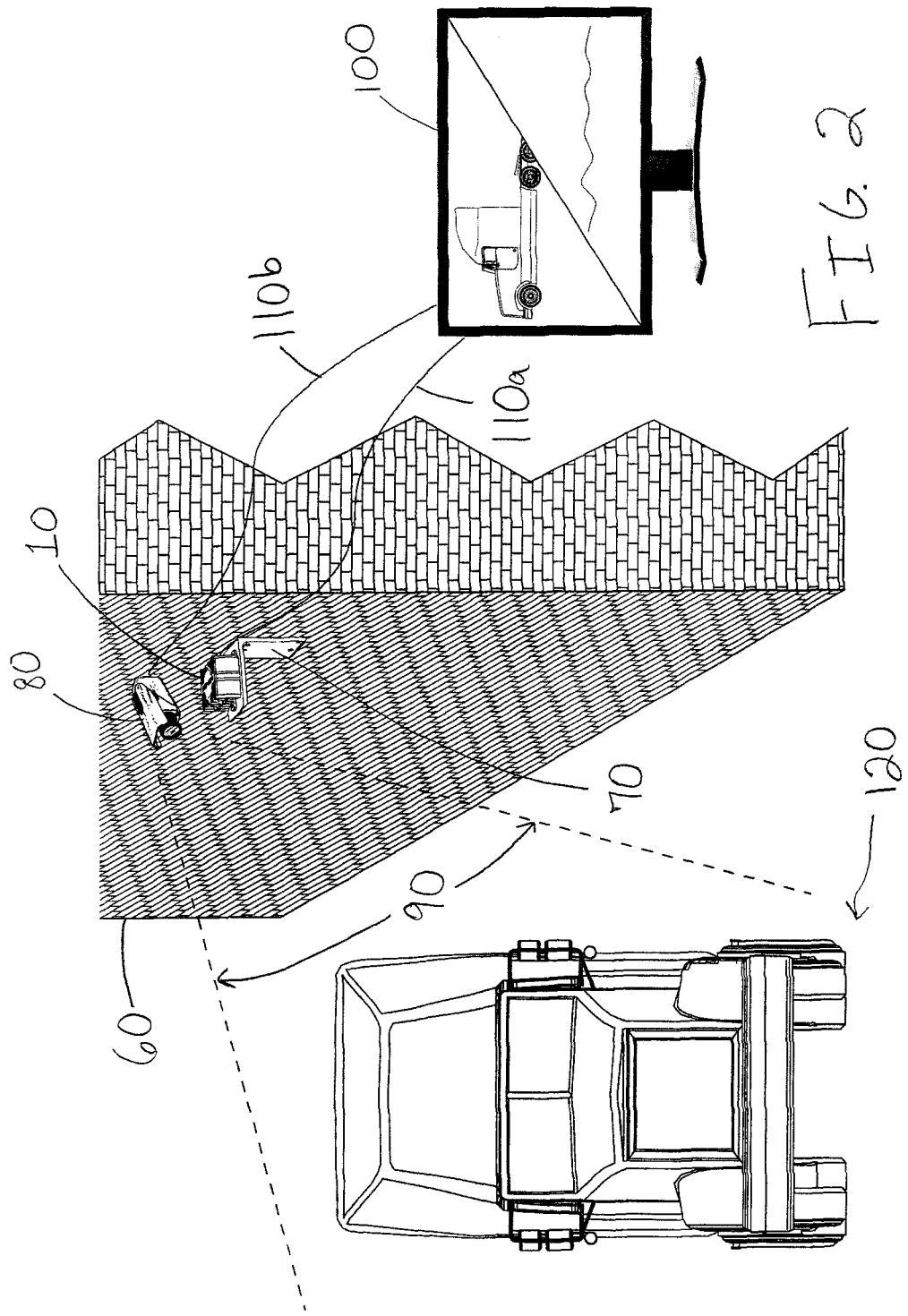
FIG. 2 is a diagram showing the exemplary sensor module of FIG. 1 attached to another structure.
Figure 3:
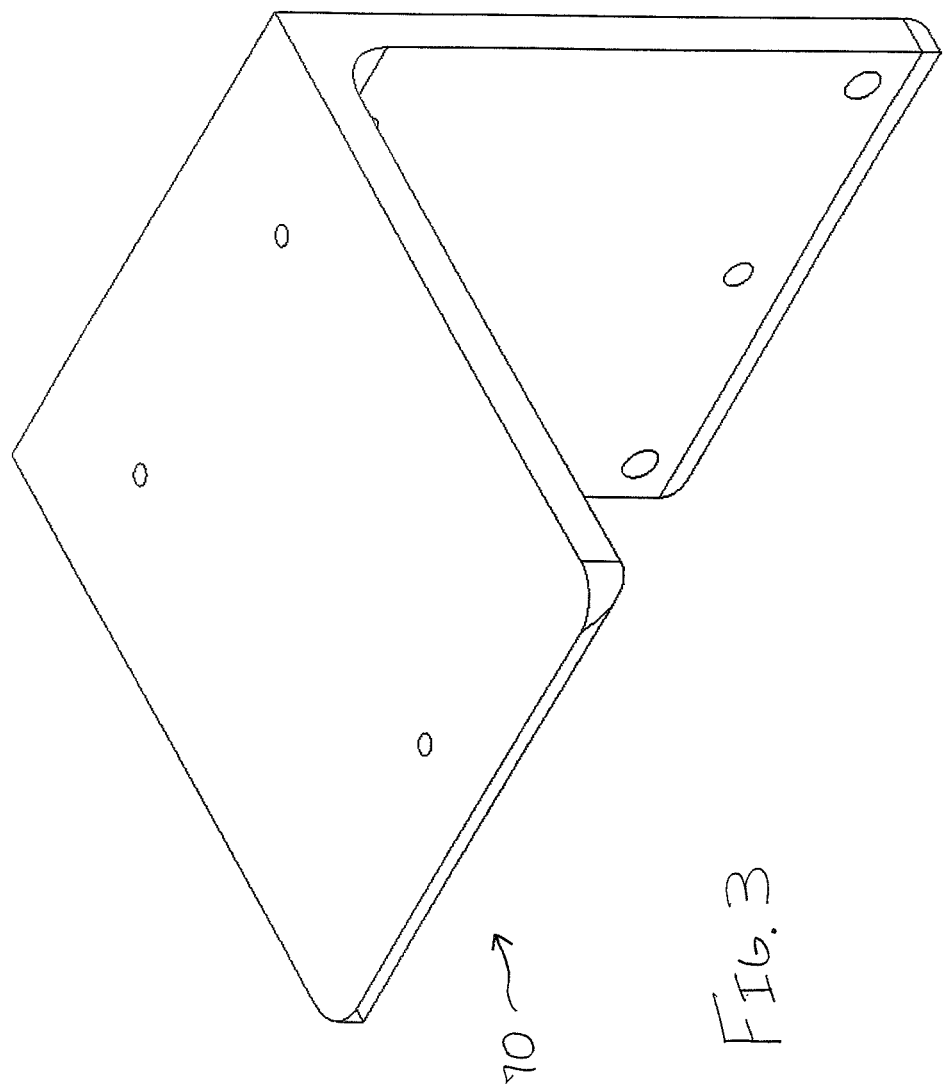
FIG. 3 is an exemplary mount that can be used to attach the sensor module of FIG. 1 to a structure such as a bridge or a building.

In FIG. 2, sensor module 10 is attached to a building 60 via a mount 70. Mount 70 is shown detached from sensor module 10 in FIG. 3. In order for sensor module 10 to sense the dynamic responses of a structure, the sensor module 10 should be secured to the structure in such as way as to provide a rigid mechanical coupling of the sensor module 10 to the structure. The sensor module can be directly bolted to the structure or it can be bolted to an adapter plate that is welded, bolted, or screwed to the structure. Adapter plates can take the form of, for example, flat plates for adapting to a horizontal plane, or angle plates (such as mount 70) for adapting to a vertical plane. The adapter plates and the methods for securing the sensor module 10 need to posses the proper mechanical attributes to ensure that the stiffness and dampening properties of the mounting scheme does not modify, alter, or dampen the structure's true response to input.

Returning to FIG. 2, a camera 80 with a field of view 90 is attached to the building 60 near the sensor module 10. An imaging device such as camera 80 may alternatively be attached to, or incorporated within, sensor module 10. The field of view 90 of camera 80 may be used to view sources of vibration, such as vehicles passing by on a road or a bridge. Camera 80 (or an additional camera, not pictured) may alternatively be positioned so that the building 60 (or other structure being monitored) falls within field of view 90. The sensor module 10 and the camera 80 are connected to a video display 100 via communication channels 110a and 110b, respectively. Communication channels 110a and 110b may be wired or wireless telecommunications channels capable of carrying data from a first point to a second point. A truck 120, which may cause vibrations picked up by the sensor module 10 as it drives by, is shown within field of view 90.

Figure 4:
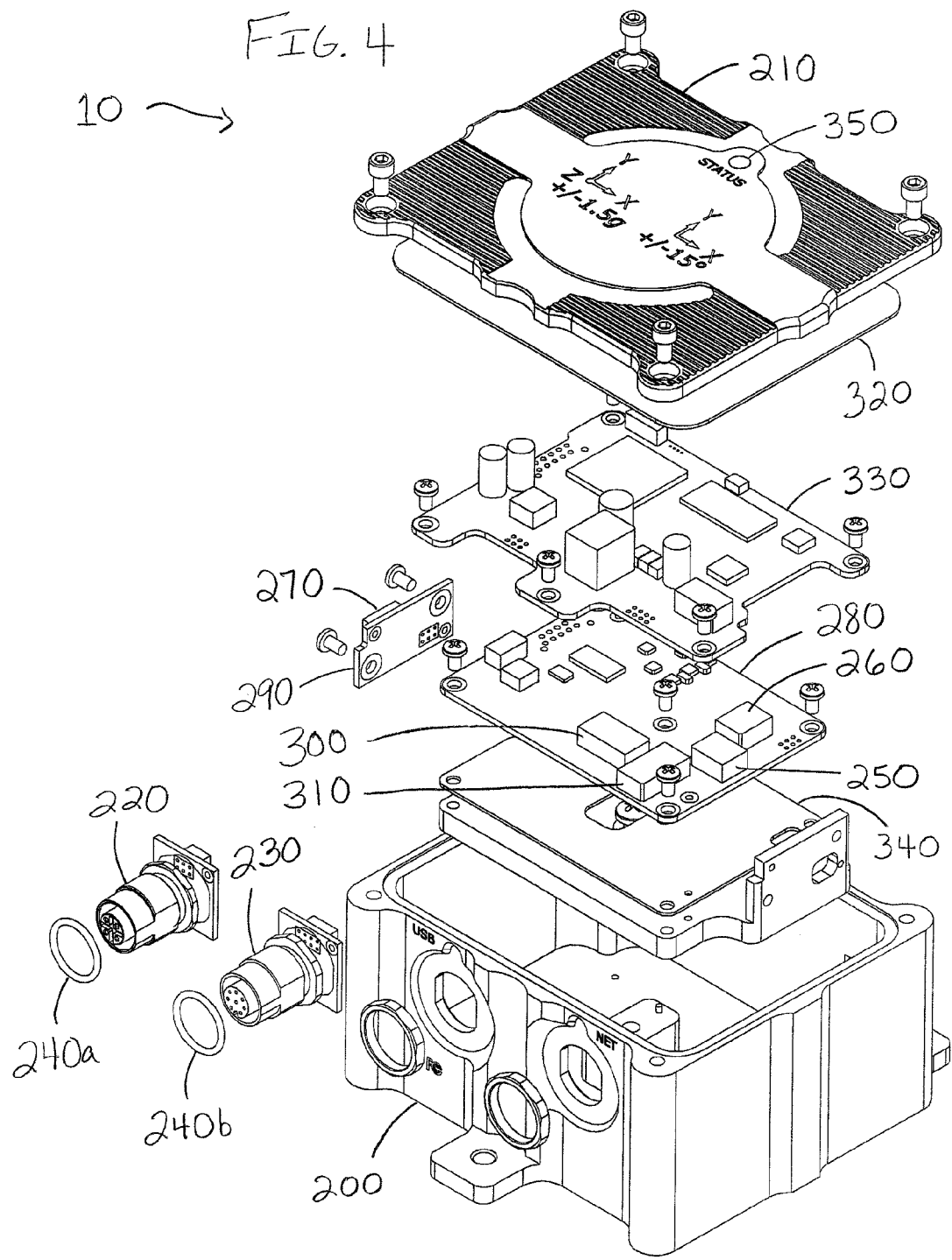
FIG. 4 is disassembled view of representative components of the sensor module of FIG. 1.

Referring to FIG. 4, the exemplary sensor module 10 is shown disassembled into representative component parts. Sensor module 10 includes a case 200 and a lid 210 for housing the depicted internal components of the sensor module 10. An M8 connector 220 and an M12 connector 230 allow the sensor module 10 to connect to external devices through USB and Ethernet communication ports, respectively. O-rings 240a and 240b, which interface with M8 connector 220 and M12 connector 230, respectively, seal the connectors 220 and 230 from water and dust. M8 connector 220 and M12 connector 230 each utilize a common-cable assembly for both power and communications. Sensor module 10 may, for example, be powered by a five-volt connection from the Ethernet or the USB.

Sensor module 10 includes a dedicated accelerometer that takes readings in three accelerometer axes, and a dedicated inclinometer that takes readings in two accelerometer axes. Specifically, sensor module 10 includes an x-axis accelerometer 250, a y-axis accelerometer 260, and z-axis accelerometer 270. The x-axis accelerometer 250 and the y-axis accelerometer 260 are part of a first printed circuit board assembly 280, and z-axis accelerometer 270 is part of a second printed circuit board assembly 290. Sensor module 10 also includes an x-axis inclinometer 300 and a y-axis inclinometer 310, both of which are part of first printed circuit board assembly 280. Here, the x-axis and the y-axis are common between the accelerometer and the inclinometer.

Sensor module 10 additionally includes a third printed circuit board assembly 320, a fourth printed circuit board assembly 330, and a fifth printed circuit board assembly 340. The five printed circuit board assemblies (280, 290, 320, 330, and 340) of sensor module 10 may include analog-to-digital converters; analog filters; memory for instructions; storage memory; buffer memory; network and direct communication interfaces; power supplies; timing crystals; and light-emitting diodes (LEDs). A lid aperture 350 can serve as a status indicator by permitting the light emitted by an LED inside the sensor module 10 to exit through lid 210.

Figure 5:
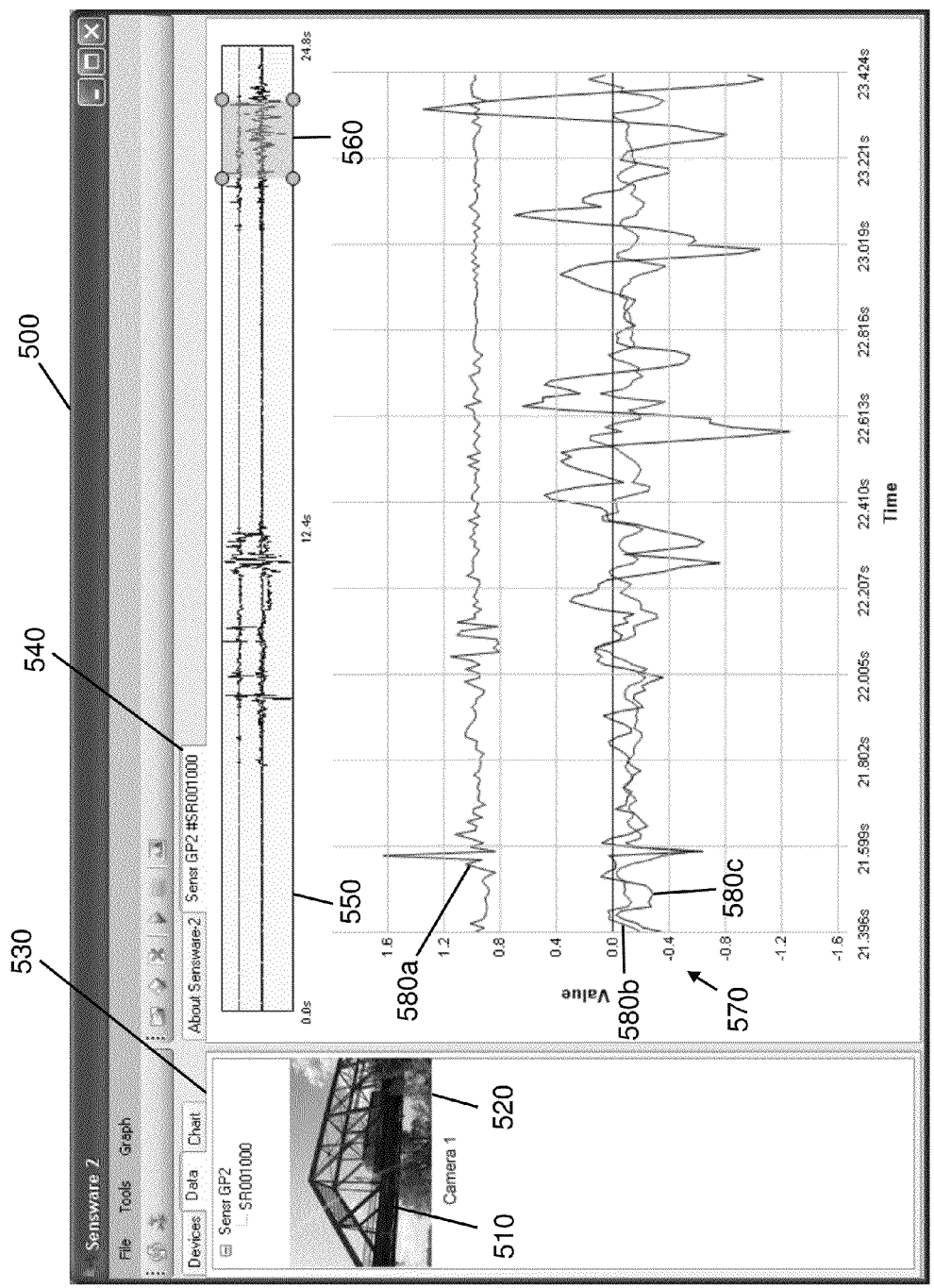
FIG. 5 is a sample screenshot of analysis software used with the sensor module of FIG. 1.

FIG. 5 shows a sample screenshot 500 of an analysis software package that receives input from the sensor module 10 attached to bridge 510. The software package may be installed on computer 30, and may communicate directly with sensor module 10 to specify how sensor module 10 measures a structure's responses during normal and abnormal conditions. The software package may specify what data are collected from the sensor module 10 (and how), and what data are stored, displayed, manipulated, analyzed, or passed on. Sensor module 10 reports its status and capabilities to the software package, and a user may specify what data channels are to be measured and how data are to be treated. The user may specify, for example, that (1) data are to be passed-through as raw data readings; (2) raw data readings are to be modified, such as through up- or down-sampling, low-pass filtering, high-pass filtering, band-pass filtering, change from time-base to frequency-base (through a Fourier transform), wavelet analysis, etc.; (3) individual channel readings are to be modified based on the input from another sensor channel; or (4) only readings meeting or exceeding certain control conditions (for example, peak threshold or maximum change over a specific duration) are to be passed along.

The software package may also control access to the data. Data can be viewed or analyzed within the local network or it can be accessed remotely from a connecting network. The software may also have remote notification capabilities whereby the user can specify email addresses and text message numbers to receive either status/summary updates or critical condition alerts.

An image box 520 depicts a still image or video footage from a camera positioned to include bridge 510 in its field of view. A navigation pane 530, which includes image box 520, permits a user to navigate between and select the sensor module 10 being monitored. An identification tab 540 identifies the sensor module 10 selected for monitoring. A timeline 550 depicts accelerometer readings from sensor module 10 from zero seconds to 24.8 seconds. A frame 560 identifies a portion of timeline 550 (from 21.396 seconds to 23.424 seconds) that is the focus of a graph 570.

In graph 570, the x-axis depicts time in seconds, and the y-axis depicts acceleration as a fraction of "g". The three plotted lines 580a, 580b, and 580c represent the z-, y-, and x-axis readings, respectively, taken as a train passes over the bridge 510. Timeline 550 reveals that there is a roughly-periodic vibrational input to bridge 510. Graph 570 reveals that in frame 560, there is greater variability along the y-axis 580b and the x-axis 580c (which, here, are in plane with the train track) than the z-axis 580a. However, until about 23.35 seconds, the z-axis 580a experiences a greater magnitude acceleration (between approximately 0.8 and 1.65). Based on past readings, observation, and experience, it can be determined, for example, that a particular event results in a recognizable signature in the readings of the sensor module 10. Such event signatures help identify, characterize, and classify real-world occurrences. Using collected data along with event signatures, it can be determined, for example, that in this scenario a rail car is changing tracks at a nearby yard and the train on the bridge is backing up to get off a main track.

Figure 6:
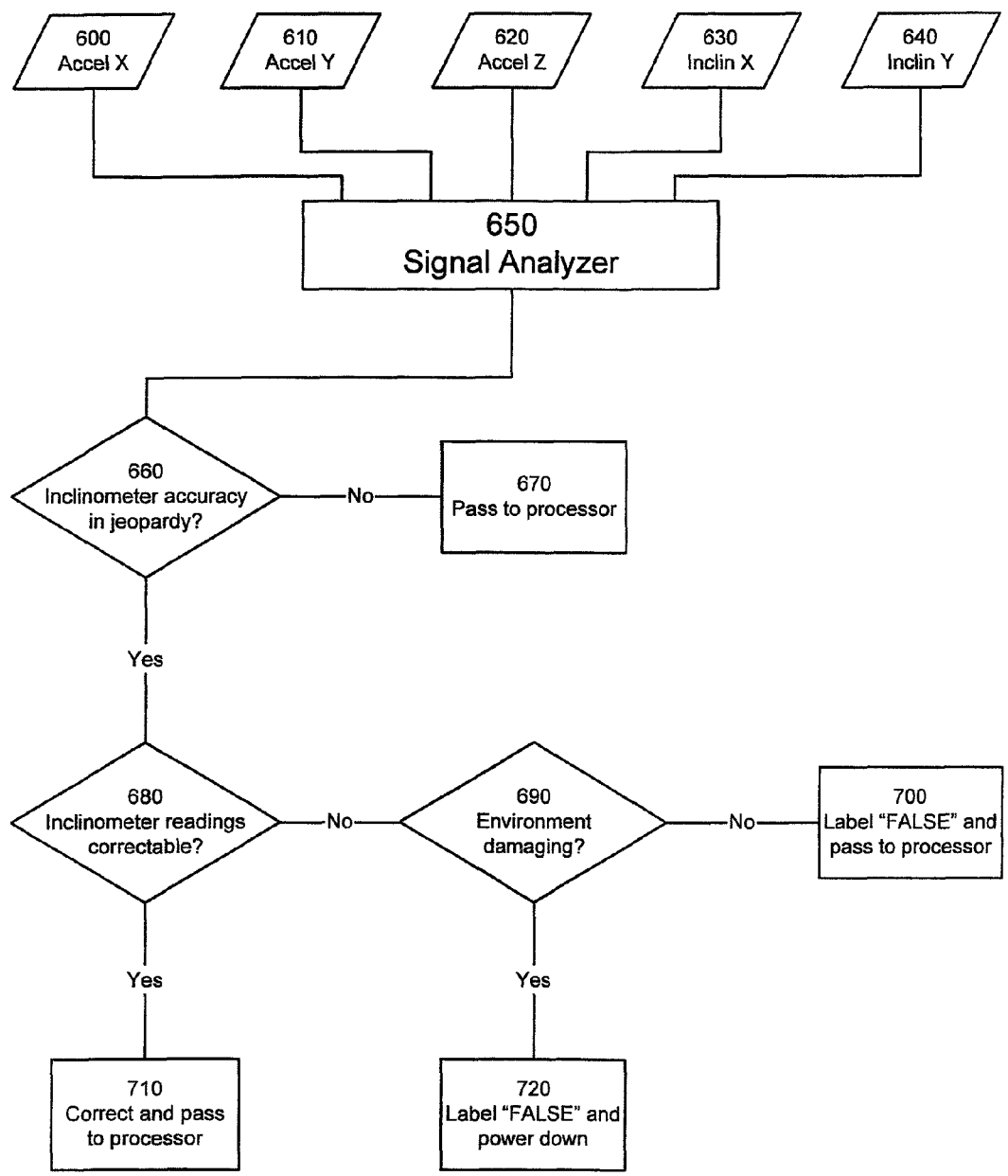
FIG. 6 is flowchart representing an exemplary signal analyzer receiving inputs from three accelerometer axes and two inclinometer axes.

FIG. 6 depicts a flowchart for analysis of signals from sensor module 10. Signals 600, 610, 620, 630 and 640 provide inputs from x-axis accelerometer 250, y-axis accelerometer 260, z-axis accelerometer 270, x-axis inclinometer 300, and y-axis inclinometer 310, respectively. The inclinometer readings are thus obtained using two dedicated inclinometer units, and the accelerometer readings are obtained using three dedicated accelerometer units.

Signal analyzer 650 receives the signals and first determines whether the accuracy of the inclinometer readings is in jeopardy 660. Specifically, in determination 660, the signal analyzer determines whether the accelerometer inputs indicate that the dynamic environment of the inclinometer threatens the accuracy of the inclinometer's readings. For example, if the amplitude (such as a vector magnitude obtained from the combination of the x-, y-, and z-axes), frequency, duration, or other characteristics of the accelerometer readings indicate that the inclinometer readings were taken at a frequency outside of the ideal frequency range of the inclinometer, then the inclinometer readings may be unreliable.

Figure 7:
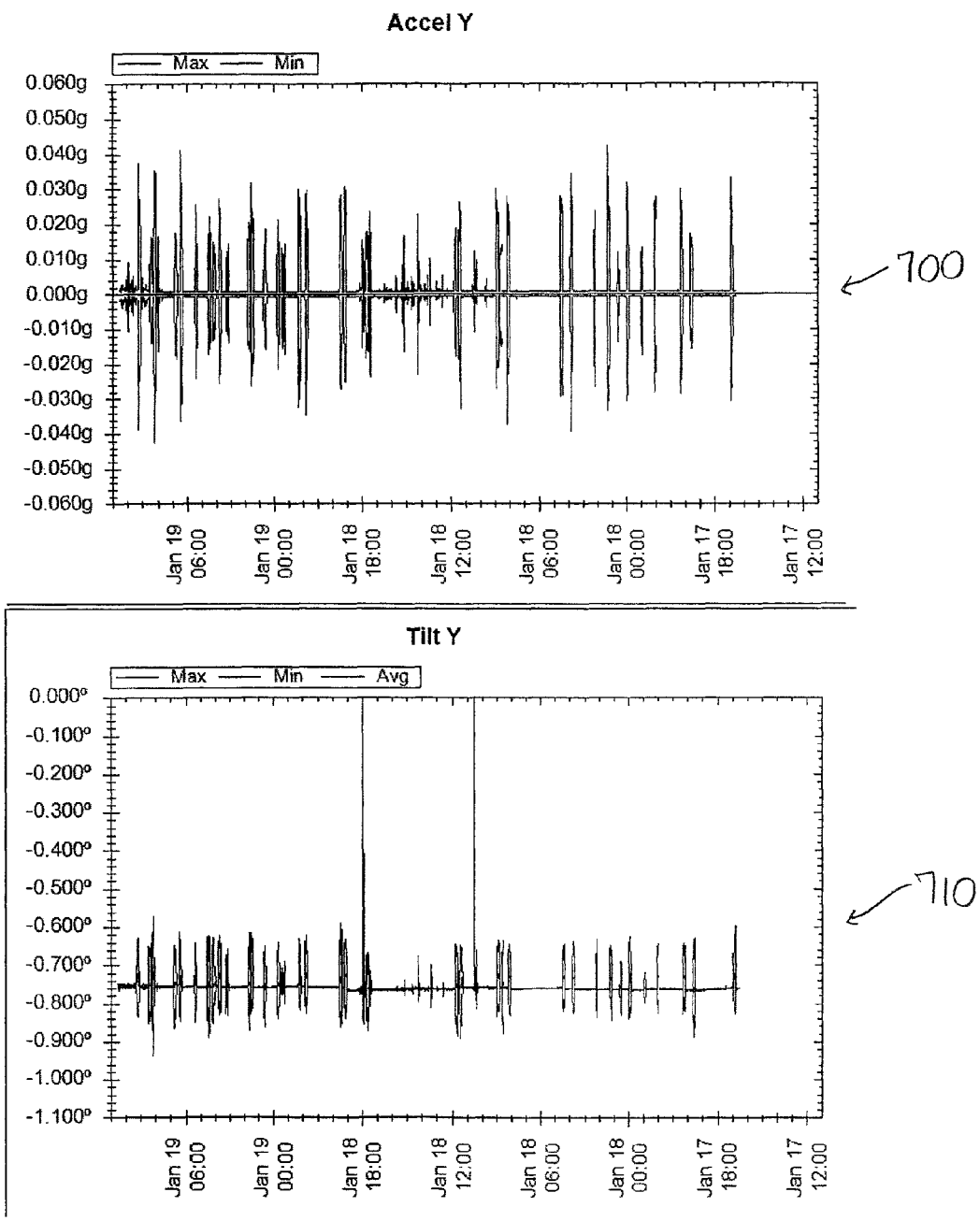
FIG. 7 is a pair of graphs with accelerometer and inclinometer readings obtained during a same time period.

One scenario demonstrating when inclinometer readings may be in jeopardy is depicted in FIG. 7. The top chart 700 is an acceleration-versus-time graph of accelerometer readings taken along the y-axis. The bottom chart 710 is an angle-versus-time graph of inclinometer readings taken along the same y-axis during the same time period. The top chart 700 shows periods of quiet (at 0.000 g) interjected by bursts of motion caused by such vibrational episodes as trains, construction, and ice strikes. Bottom chart 710 shows that, during the bursts of motion, the tilt angles show great variability. The variability arises from the inclinometer's attempt to measure its rapidly changing state, and the inclinometer's readings do not indicate tilt but rather vibration. This occurs because the inclinometer cannot distinguish between the vibration and the tilt. If the inclinometer readings were to be interpreted without the benefit of the accelerometer readings, a user may wrongly conclude, for example, that the inclinometer is defective or that the structure is damaged or even facing impending collapse (potentially resulting in an unnecessary evacuation). Consequently, the accelerometer readings reveal quiet periods during which inclinometer readings would be reliable, providing a truer inclination picture. If the accuracy of inclinometer readings is not in jeopardy, the inclinometer readings are passed to a processor for processing 670. The processor may, for example, be used to perform statistical analyses and mathematical transformations, or to organize and display the data and calculations based thereon.

Referring again to FIG. 7, if the accuracy of inclinometer readings is in jeopardy, then it is determined whether the inclinometer readings can be modified to be corrected 680. For example, an inclinometer may be tuned to respond to accelerations in the zero to 8 Hz bandwidth range. If it is determined that there is a 5 Hz acceleration present during a specific sampling period, the system can identify the 5 Hz input and invoke a filter scheme to remove the 5 Hz influence from the sample. Alternatively, the system can adjust which samples are used for calculating inclination values. For example, a default scheme for calculating an inclination value may be to take 100 samples, at a rate of 10 samples per second, every hour. If the environment resulted in 20 low-quality samples, the system could adjust its calculating scheme by taking an average of the 80 good samples, or it could throw the sample session away and run a new session.

If they can be modified to be corrected, the inclinometer readings are modified and passed on to the processor 710. If the inclinometer readings are not correctable, it is determined whether the environment is damaging to the system 690. If the environment is not damaging, the inclinometer readings are labeled "FALSE" and passed on to the processor 700. As inclinometers have less of an ability to deal with vibration than accelerometers, they are susceptible to shocks when powered on. The more often the inclinometer is not in a powered state in rough environments, the longer its life expectancy. As such, if the environment is deemed to be potentially damaging, the inclinometer readings are labeled "FALSE" and the elements of the system that are susceptible to damage by the environment are shut down 720 until safe limits are measured. The accelerometer readings may indicate potentially damaging environmental conditions if the energy of the accelerations detected (based on, for example, amplitude, frequency, and duration) exceed a given threshold. A train on a bridge, for example, may otherwise expose the inclinometer to an extended and damaging period of high vibration.

An exemplary sensor module 10 improves data accuracy and reliability by monitoring environmental conditions during sampling, allowing, among other things: (1) verification of inclination data validity before passing the data to a processor; (2) identification of environmental conditions during sampling that may invalidate inclination data, such as amplitude and frequency of motion that are beyond the operating range for the inclinometer; (3) application of corrective filters to the inclinometer data based upon actual environmental data; (4) use of acceleration and inclination response signatures representative of a structure's response to particular internal and external forces to dynamically adjust what acceleration and inclination readings are reported based on threshold criteria; (5) identification of inclination data as invalid and not correctable if corrective filters are not available for the specific environment; and (6) identification of environmental conditions that would damage the inclinometer if the inclinometer remained powered. As a result of element (6), the system would power down the sensing elements that are susceptible to damage, keeping them powered down as long as environmental conditions are harmful. This would greatly enhance the service life of the inclinometer. Overall, data accuracy is improved through verification that environmental conditions are within the sensing limits of the inclinometer, expanding the environmental range of the inclinometer through compensation and selective processing based upon the true environmental conditions.

In the case of an impact event resulting from a barge strike on a train bridge, an inclinometer would register a very large tilt change in the samples taken during the impact. If the impact was of sufficiently high energy, the train bridge may become deformed. To validate a deformation rather than, for example, back-and-forth swaying, accelerometer readings taken prior, during, and after the impact can be analyzed. For example, waveform and Fast Fourier Transform signatures of the impact event could help clearly identify the impact and whether an actual deformation resulted.

In using a system that includes sensor module 10 and computer 30 loaded with an appropriate software package, a user may begin by selecting the parameters to be measured. Options include which axes (x, y, and/or z) to include in the measurements and which type of readings to take (acceleration and/or inclination). The user may continue by defining which data should be reported. For example, the user may select:

(i) raw measurements—these include acceleration in an axis (in meters per second squared); tilt (in degrees); vector magnitude of measurements from two or more axes; sample rate (in samples per second); filter cut-off frequency limits for sensor response (for example, high pass, low pass, and band pass limits for a working range); and/or threshold recording criteria (such as a minimum or maximum acceleration or tilt required for recording a sample);

(ii) statistical measurements—such as MIN, MAX, average, root mean square ("RMS"), threshold count (that is, an accounting of samples crossing a threshold trip value); epoch setting (such as one per second, one per minute, one per hour, one per six hours, etc.); and/or sample rate and filter cut-offs (analogous to raw measurement options); and (iii) smart values—condition-assessed measurements requiring a condition to be met for values to be included (such as an angle range of 12 to 30 degrees).

Criteria for measurements can be adjusted dynamically. For example, in a scenario in which a structure is exposed to varying levels of vibration (such as during construction), a dynamic RMS can be measured over a past period of three hours, and calculated values can be used to set criteria points for instructing subsequent measurements. The dynamic RMS can be re-surveyed at specific times to revise criteria points.

Preferred versions of the invention have been described above in order to illustrate how to make and use the invention. The invention is not intended to be limited to these versions, but rather is intended to be limited only by the claims set out below. Thus, the invention encompasses all different versions that fall literally or equivalently within the scope of these claims.

What is claimed is:

1. A method of monitoring integrity of a structure, including the steps of:
    a) obtaining acceleration readings using an accelerometer with a first sensor; and
    b) simultaneously obtaining separate inclination readings using an inclinometer with a second sensor that is separate from the first sensor, the inclinometer and the accelerometer being housed in one sensor module;
    c) wherein:
        1) the inclination readings are obtained at an inclination sampling rate using the second sensor,
        2) the acceleration reading are obtained at an accelerometer sampling rate using the first sensor,
        3) the accelerometer sampling rate is higher than the inclinometer sampling rate; and
    a step of powering down the inclinometer based on acceleration readings, wherein the inclinometer is powered down if the acceleration readings are above a threshold and the inclinometer would be strained or damaged if not powered down.

2. The method of claim 1 further including the step of restoring power to the inclinometer if, based on acceleration readings, it is determined that the inclinometer would not be strained or damaged.

3. A system for monitoring integrity of a structure having a sensor module, wherein:
    a) the sensor module includes:
        1) a dedicated inclinometer configured to take inclination readings using a first sensor:
            (i) along at least two inclinometer axes, and
            (ii) at an inclinometer sampling rate; and
        2) a dedicated accelerometer configured to take separate acceleration readings using a second sensor that is separate from the first sensor:
            (i) along at least three accelerometer axes; and
            (ii) at an accelerometer sampling rate;
    b) at least one inclinometer axis is coincident with at least one accelerometer axis; and
    c) the system is configured to:
        1) take inclinometer and acceleration readings simultaneously to discern motion and tilt experienced by a structure being monitored; and
        2) use the inclinometer to determine inclination along an inclinometer axis that is not coincident with an accelerometer axis; and
    an instructional unit configured to instruct the sensor module to take inclination readings only while acceleration readings fall below a threshold, wherein the inclinometer would be damaged if inclination readings are taken while acceleration readings exceed the threshold;
wherein the accelerometer sampling rate is higher than the inclinometer sampling rate.

4. A system for monitoring integrity of a structure having a sensor module, wherein:
- a) the sensor module includes:
    - 1) a dedicated inclinometer configured to take inclination readings using a first sensor:
        - (i) along at least two inclinometer axes, and
        - (ii) at an inclinometer sampling rate; and
    - 2) a dedicated accelerometer configured to take separate acceleration readings using a second sensor that is separate from the first sensor:
        - (i) along at least three accelerometer axes; and
        - (ii) at an accelerometer sampling rate;
- b) at least one inclinometer axis is coincident with at least one accelerometer axis; and
- c) the system is configured to:
    - 1) take inclinometer and acceleration readings simultaneously to discern motion and tilt experienced by a structure being monitored; and
    - 2) use the inclinometer to determine inclination along an inclinometer axis that is not coincident with an accelerometer axis;

wherein the system is configured to power down the inclinometer without powering down the accelerometer when the inclinometer would be strained or damaged if not powered down and subsequently restore power to the inclinometer if, based on acceleration readings, the inclinometer would not be strained or damaged.

\* \* \* \* \*